United States Patent [19]
Stephens, Jr. et al.

[11] Patent Number: 5,733,357
[45] Date of Patent: Mar. 31, 1998

[54] PROCESS FOR CONVERTING IRON OXIDE TO IRON CARBIDE EMPLOYING INTERNALLY GENERATED CARBON OXIDE AS THE CARBIDING AGENT

[75] Inventors: Frank M. Stephens, Jr., Lakewood; Frank A. Stephens; Robert F. Hogsett, both of Arvada, all of Colo.

[73] Assignee: Iron Carbide Holdings, Ltd., Lakewood, Colo.

[21] Appl. No.: 596,954

[22] Filed: Feb. 5, 1996

[51] Int. Cl.[6] .............................. C22B 5/14; C01B 31/30
[52] U.S. Cl. .............................. 75/444; 75/505; 423/439
[58] Field of Search ........................ 75/444, 505; 423/439

[56] References Cited

U.S. PATENT DOCUMENTS

| | | | |
|---|---|---|---|
| Re. 32,247 | 9/1986 | Stephens, Jr. ........................ | 75/11 |
| 2,780,537 | 2/1957 | Stelling et al. ...................... | 75/26 |
| 4,396,423 | 8/1983 | Stephens, Jr. et al. ............... | 75/25 |
| 4,398,945 | 8/1983 | Stephens, Jr. ........................ | 75/11 |
| 5,073,194 | 12/1991 | Stephens et al. .................... | 75/376 |
| 5,118,479 | 6/1992 | Stephens, Jr. et al. ............... | 423/148 |
| 5,137,566 | 8/1992 | Stephens, Jr. et al. ............... | 75/507 |
| 5,366,897 | 11/1994 | Hager et al. ........................ | 436/55 |
| 5,437,708 | 8/1995 | Meissner et al. .................... | 75/490 |

FOREIGN PATENT DOCUMENTS

| 48 | 6/1994 | Trinidad/Tobago . |
|---|---|---|
| 40 | 10/1995 | Trinidad/Tobago . |

*Primary Examiner*—Melvyn Andrews
*Attorney, Agent, or Firm*—Sheridan Ross P.C.

[57] ABSTRACT

A process for converting iron oxide to iron carbide using hydrogen as a reducing gas. Water is generated by the reduction of the iron oxides using hydrogen. The amount of water present in the reactor system is controlled and the water is contacted with methane in order to internally generate carbon monoxide and/or carbon dioxide gas. The carbon monoxide and/or carbon dioxide is subsequently employed to carburize the iron to iron carbide.

42 Claims, 1 Drawing Sheet

PROCESS FOR CONVERTING IRON OXIDE TO IRON CARBIDE EMPLOYING INTERNALLY GENERATED CARBON OXIDE AS THE CARBIDING AGENT

BACKGROUND OF THE INVENTION

1. Field of the Invention

The present invention relates to a process for converting iron oxide to iron carbide employing hydrogen as a reducing agent and carbon monoxide and/or carbon dioxide as the carbon transfer agent. In particular, the process involves controlling the residence time of gases and the level of water present in the reactive system in order to internally generate carbon monoxide and/or carbon dioxide by reacting water with methane, thus reducing or eliminating the need to externally add carbon monoxide or carbon dioxide to the system.

2. Description of the Related Art

Processes for converting iron-containing feed to iron carbide are known. For example, U.S. Pat. No. Reissue 32,247 reissued Sep. 16, 1986, entitled "PROCESS FOR THE DIRECT PRODUCTION OF STEEL" which is a reissue of U.S. Pat. No. 4,053,301 issued Oct. 11, 1977 to Stephens, Jr. discloses a process for the direct production of steel employing iron carbide. In this process, iron ore is converted to iron carbide, $Fe_2C$ and/or $Fe_3C$, and the iron carbide is then converted directly to steel in a basic oxygen furnace or an electric arc furnace, thereby eliminating the blast furnace step altogether. The key to this process is the conversion step, in which iron oxide in the iron ore is reduced and carburized in a single operation using a mixture of hydrogen as a reducing agent and carbon bearing substances as carburizing agents. Hydrogen is the preferred reducing gas although carbon monoxide or hydrocarbon gases or mixtures may be used. The preferred carburizing gas is propane, although carbon monoxide or other hydrocarbon gases or solid carbon may be used, with the lower alkyl hydrocarbon gases being preferred. Methane is found to be present in the gas system. Further, the volume of hydrogen in a hydrogen-carbon monoxide reducing and carburizing mixture in the fluidized unit should exceed the volume of carbon monoxide, the preferred amount of hydrogen being over about 60 percent by volume of the carbon monoxide present.

U.S. Pat. No. 5,073,194 entitled "PROCESS FOR CONTROLLING THE PRODUCT QUALITY IN THE CONVERSION OF REACTOR FEED INTO IRON CARBIDE" issued Dec. 17, 1991, by Stephens, et al. and assigned to Iron Carbide Holdings, Ltd. discloses a process for controlling product quality in the conversion of a reactor feed to an iron carbide-containing product in a fluidized bed reactor. The method includes analyzing product samples leaving the fluidized bed reactor and adjusting process parameters as appropriate. The process employs a five component process gas which includes hydrogen, carbon monoxide, carbon dioxide, methane and water, although other gases, such as nitrogen, may be present in the system. It is disclosed that the preferred reducing gas is hydrogen, although carbon monoxide or hydrocarbon gases or mixtures of hydrogen with carbon monoxide and hydrocarbon gases may be used. Hydrogen gas is preferred as a reducing gas because the oxidation product of hydrogen, water, may be easily removed from the off gas, thereby providing easier recycling of the off gas than with other possible reducing gases. It is also disclosed that methane is preferred for the carburizing gas, although carbon monoxide, other hydrocarbon gases and solid carbon may be used. The source of the methane may be another hydrocarbon gas or a combination of gases that crack or otherwise combine to form methane under the conditions present in the reactor.

U.S. Pat. No. 5,366,897 entitled "METHOD FOR CONTROLLING THE CONVERSION OF IRON-CONTAINING REACTOR FEED INTO IRON CARBIDE" issued Nov. 22, 1994, by Hager, et al. and assigned to Iron Carbide Holdings, Ltd. is directed to a process for controlling the conversion of reactor feed to iron carbide by monitoring and adjusting the composition of the process gas. It is disclosed that the region in which the pressure and gas composition measurements are taken is directly above the fluidized bed and the reaction gas is the equilibrium off gas from the conversion of reactor feed into iron carbide. As with U.S. Pat. No. 5,073,194 discussed above, it is disclosed that the preferred reducing gas is hydrogen, although carbon monoxide or other hydrocarbon gases can be used and the preferred carburizing gas is methane, although carbon monoxide, carbon dioxide, hydrocarbon gases and solid carbon may be used. The independent equilibria equations for the process gas in the reaction chamber are described by:

$$CO + H_2O \rightleftharpoons CO_2 + H_2; \text{ and}$$

$$CH_4 + H_2O \rightleftharpoons CO + 3H_2.$$

Preferred volume percents of the five process gases are also disclosed, although the exact percentages will be different for each combination of temperature and mole ratios of hydrogen to oxygen and of carbon to oxygen. The process gas preferably comprises a combination of hydrogen and methane, which may be provided by respective external gas sources. Preferably, the process gas also includes carbon monoxide, carbon dioxide and/or water and external makeup gas may be used to supplement recycled off gas to obtain a process gas having desired concentrations of the individual gases.

U.S. Pat. No. 5,137,566 entitled "PROCESS FOR PREHEATING IRON-CONTAINING REACTOR FEED PRIOR TO BEING TREATED IN A FLUIDIZED BED REACTOR" issued Aug. 11, 1992, by Stephens, Jr. et al. and assigned to Iron Carbide Holdings, Ltd. discloses a process for preheating reactor feed in an oxidizing atmosphere prior to conversion to iron carbide. Preferably, at least a portion of any magnetite ($Fe_3O_4$) in the reactor feed is converted to hematite ($Fe_2O_3$) in this oxidizing step. The inventors have found that a reactor feed having iron oxide mostly in the form of hematite more readily converts to iron carbide than reactor feed comprising mostly magnetite. The preheating step will not only oxidize the magnetite to hematite, but it can also stabilize and/or eliminate sulphur and reduce the amount of free moisture in the reactor feed, thus improving the yield and the efficiency of the conversion.

U.S. Pat. No. 5,118,479 entitled "PROCESS FOR USING FLUIDIZED BED REACTOR" issued Jun. 2, 1992, by Stephens, Jr. et al. and assigned to Iron Carbide Holdings, Ltd. discloses a modified design for a fluidized bed reactor in which the conversion of the reactor feed to iron carbide takes place. Baffles have been added to the reactor to create plug flow conditions and regulate the residence time of the reactor feed in the reactor, thus reducing problems caused by reactor feed short circuiting the reactor and resulting in unconverted feed material in the product. Plug flow enables utilization of the entire area of the reactor while requiring only a single feed point and a single discharge point. This permits the most efficient use of incoming process gas, since the process gas contacts the reactor feed as it flows through the fluidized bed to efficiently and effectively convert the reactor feed to iron carbide.

U.S. Pat. Nos. 5,118,479 and 5,137,566 both disclose the advantages of removing water from a preheated reactor feed. It is disclosed that the preferable total water content in the preheated reactor feed is less than about 4 percent, more preferably less than about 3 percent and more preferably less than about 2 percent.

U.S. Pat. No. 4,396,423 entitled "PROCESS FOR RECOVERING IRON AND ZINC FROM STEEL MAKING DUSTS" issued Aug. 2, 1983, by Stephens, Jr. et al. is directed to a process for recovering iron and zinc from flue dusts. One step of the process includes carbiding the iron. Preferably, the reducing and carbidizing agents are hydrogen and carbon monoxide and the hydrogen is present in an amount over 60 percent by volume of the carbon monoxide present. Preferably, the ratio of hydrogen to formed water in the reaction medium of the fluidized bed is maintained from about 2.5:1 to about 8:1 and the ratio of CO to $CO_2$ is maintained from about 1:1 to about 4:1, the prescribed $CO/CO_2$—$H_2/H_2O$ ratios being essentially in equilibrium with methane.

U.S. Pat. No. 4,398,945 entitled "PROCESS FOR PRODUCING A FERRONICKEL ALLOY FROM NICKEL BEARING LATERITES" issued Aug. 16, 1983, by Stephens, Jr. discloses a process for recovering iron and nickel from low iron content laterite ores. The process includes an iron carbiding step using gas compositions containing 63 to 69 percent hydrogen as the reducing agent, 10 to 20 percent methane and 12 to 16 percent carbon monoxide as carbon supplying agents, and 3 to 12 percent carbon dioxide.

Each of the above-identified patents, U.S. Pat. Nos. 4,396,423; 4,398,945; 4,053,301; Reissue 32,247; 5,073,194; 5,118,479; 5,137,566; and 5,366,897, are incorporated herein by reference in their entirety.

U.S. Pat. No. 2,780,537 discloses a process for converting iron oxides to carbides in a fluidized bed process in which carbon monoxide is used as a chief reducing and carburizing gas. The patent teaches that the reducing gas cannot contain hydrogen in an amount more than 50 percent by volume of the carbon monoxide content.

Although the above-mentioned patents dealing with converting iron oxides to iron carbides discuss various reducing and carburizing agents, they disclose addition of the appropriate agents from an external source. It would be advantageous to provide a process in which the system were controlled in order to take advantage of internally generated gaseous components. It would be advantageous to employ the equilibrium equations in order to control the conversion of a byproduct of the reduction phase into a carbiding agent for use in the carburizing phase. Many of the references disclose that methane is a preferred carburizing agent. It would be advantageous to employ carbon monoxide as the carbiding agent. It would be advantageous to minimize or eliminate the need to add carbon monoxide to this system by internally generating carbon monoxide. It would be advantageous to control the water level, and in particular the water generated by the reduction of iron oxide with hydrogen, in order to internally generate carbon monoxide. It would be advantageous to control the water level and the contact time of the various gases with the water in the presence of iron-containing catalysts in order to internally generate carbon monoxide.

SUMMARY OF THE INVENTION

In accordance with the present invention, a process is provided for converting iron oxide to iron carbide and employing internally generated gaseous components to increase the efficiency and effectiveness of the process. As used herein, the term iron carbide includes $Fe_3C$ and $Fe_2C$ and the term iron oxide includes $Fe_2O_3$, $Fe_3O_4$ and $FeO$. The present invention provides a method for reducing iron oxide using hydrogen and thereby generating water. The water, in the form of vapor, is contacted with methane for a sufficient period of time to generate carbon monoxide. The carbon monoxide can react with water to form carbon dioxide. The presence of iron-containing catalysts, such as iron oxides, metallic iron and iron carbide, catalyze the conversion of water to carbon monoxide and carbon dioxide according to the following equations:

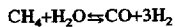

Importantly, in accordance with the present invention, it is necessary to maintain a minimum level of water vapor and contact the water vapor with methane for a minimum amount of time in the presence of iron-containing catalysts in order to form the carbon oxide gas. As used herein the term "carbon oxide" will be used to generically refer to both carbon monoxide and carbon dioxide.

In accordance with an embodiment of the present invention, a method for producing iron carbide from iron oxide is provided. The method includes providing at least about 2 mole percent water vapor, wherein a first portion of the water vapor is generated by reducing iron oxide in the presence of hydrogen and a second portion of the water vapor is provided with the input process gas. The water vapor is contacted with methane for at least 1.5 seconds in the presence of iron-bearing catalysts to generate gaseous carbon oxide. Iron is converted to iron carbide in the presence of carbon oxide. The carbon oxide acts as the carbiding agent.

Preferably, once the process is running, no additional carbon oxide needs to be added from external sources. Therefore, in a preferred embodiment of the present invention there is adequate water vapor in the reactor environment to ensure that sufficient carbon oxide is generated in the reactor, through the reaction of methane with water vapor, to provide the carbon oxide required as a carbiding agent in the formation of iron carbide, without having to add carbon oxide from an external source. Preferably, the iron carbide is produced at a temperature from about 550° C. to about 670° C. Preferably, the internal pressure of the reactor is from about 1 to about 6 atmospheres. Preferably, the gases remain in contact with the iron-bearing catalyst for a period of time from about 1.5 seconds to about 10 seconds. Preferably the reactor is a fluidized bed reactor. Preferably the reactor off gas is treated (e.g., a portion of the water is removed and hydrogen and methane are supplemented) and recycled to the fluidized bed.

Preferably the water vapor level in the reactor is from about 3 mole percent to about 7 mole percent. The water vapor level can be measured at a point downstream from where the gas exits the reactor. At the point of measurement, the water vapor analysis measures the average water vapor level. In a baffled plug flow fluidized bed reactor, the water vapor level will vary across both vertical and horizontal dimensions of the fluidized bed. For example, the water vapor level will vary across horizontal dimensions of the fluidized bed because there is more iron oxide on the feed side of the bed than the product side, and therefore the water vapor content of the gases on the feed side of the bed is higher (e.g., up to 30% in some cases) than on the discharge, product side of the bed, (e.g., where the water vapor can be less than 1%). Additionally, the water vapor varies in the vertical direction because when the fluidizing gas enters the fluidized bed from the bottom, there is initially no new water vapor formed until iron oxides start to react with hydrogen in the fluidizing gas. As the gas passes upward through the fluidized bed, the water content increases from bottom to top. Additionally, when a recycle gas is preferably employed, the recycle gas entering the bottom of the bed already contains some water vapor that was not removed from the recycle gas stream. This recycle water vapor level affects the average water vapor concentration in and above the fluidized bed.

In accordance with another embodiment of the present invention, a method is provided for ensuring the proper contact time between the reaction gases and the iron-bearing catalysts. The method includes the step of determining the fluidization characteristics of the solid particles which are to be converted to iron carbide. A gas velocity is then determined which is sufficiently high enough to provide for the fluidization of the solid particles and yet sufficiently low enough to prevent excessive solids carry-over from a fluidized bed reactor. A bed depth is then selected which will provide a gas residence time of from about 1.5 to about 10 seconds.

Advantageously, the method of the present invention can be employed in either a single stage or a multiple stage reactor system. For example, in a single stage reactor, the reduction of iron oxide to iron and the carburization of iron to iron carbide takes place in the single stage reactor. Alternatively, in a multiple stage reactor system part of the iron oxide is reduced to iron in a first stage reactor while leaving a portion of the oxygen (e.g., at least 50 percent of the oxygen) in the iron oxide. Preferably, the recycle gas used in the first stage reactor would contain no methane and would be separated from the gases used in the second stage. In a second stage reactor, the remaining iron oxide is reduced to iron and the iron is carburized to iron carbide. In this way, the iron oxide can be reduced in the second stage in a manner to generate sufficient water vapor to provide for the formation of carbon oxide when the water vapor is contacted with methane. If there is not enough iron oxide present to provide for the formation of sufficient carbon oxide, then carbon oxide and/or water can be added from an external source to satisfy the carbiding requirement. However, it should be noted that if carbon oxide is externally added, then hydrogen consumption will increase. If water is externally added to provide extra oxygen, the iron carbide production rate can be adversely affected. In a preferred embodiment of the present invention no additional carbon oxide is added externally to the recycle gas and the water vapor level is adjusted (e.g., by removing excess water from the recycle gas stream) so that the water vapor level of the process gas entering the fluidized bed is from about 0.3% to about 2% and more preferably from about 0.5% to about 1.5%.

In accordance with another embodiment of the present invention, a method is provided for producing iron carbide. The method includes controlling the water vapor generated by the reduction of iron oxide using hydrogen in order to provide water vapor to convert methane to carbon monoxide and carbon dioxide. Preferably, the carbon monoxide and/or carbon dioxide are formed in sufficient quantities to serve as a carbiding agent to convert iron into iron carbide.

The present invention provides a number of advantages over the related art. It is advantageous to use carbon oxide as the carbiding agent in order to efficiently and effectively convert metallic iron to iron carbide. It is advantageous to internally generate the carbon oxide because when carbon oxide is added from external sources, the hydrogen consumption in the system increases in order to remove the secondary source of oxygen being brought in with the carbon oxide, and additional excess water is produced. In one embodiment of the present invention, the only oxygen being brought into the system is the oxygen in the iron oxide and water vapor is used as a carrier to regenerate the required carbon oxide content in the circulating gas stream.

DETAILED DESCRIPTION OF THE INVENTION

Figure 1:
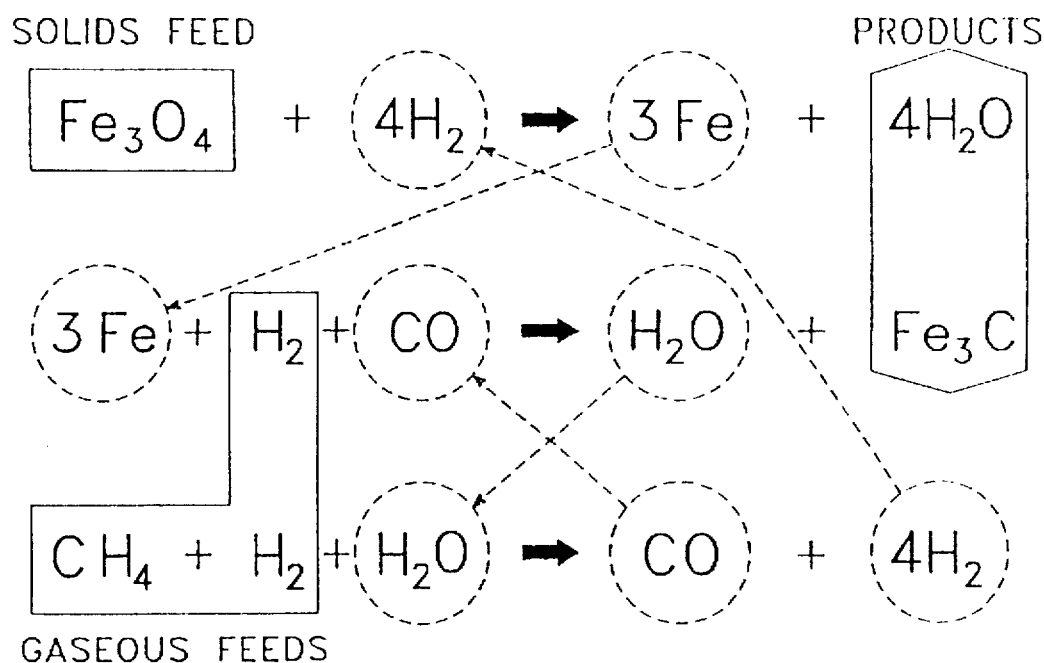
FIG. 1 illustrates the interactions between various equilibria equations.

In accordance with the present invention, a process is provided for producing iron carbide in an efficient and effective manner by employing internally generated carbon oxide gas. In connection with the present invention, three important discoveries have been combined in a unique and useful manner.

The first discovery is that the internal generation of carbon oxide provides for the efficient and effective production of iron carbide. It is believed that carbon oxide is a better carbiding agent than methane, even in the presence of larger amounts of hydrogen and methane, in the conversion from iron oxide to iron carbide when metallic iron is present. Further, internally generated carbon oxide provides for a more efficient use of resources than adding carbon oxide to the recycle gas stream, because less hydrogen is consumed and less excess water is formed.

Second, it has been determined that carbon oxide can be effectively produced within the fluidized bed by contacting methane with the proper levels of water in the presence of iron-bearing catalysts. The contact between methane and water must be maintained for a sufficient period of time in order to obtain the desired amount of carbon oxide.

Third, it has been determined that the water vapor present in the reactor is preferably obtained from two sources, water vapor present in the input process gas and water vapor internally generated within the reactor. The process gas stream is preferably recycled and the water vapor is maintained within a desired range. Too little water vapor results in methane instability and too much water vapor reduces iron carbide production. Because more water vapor is typically formed in the reactor than is needed in the recycle gas stream, water vapor is typically removed from the recycle gas stream prior to reintroducing it into the reactor. The internally generated water vapor is produced by reducing iron oxides to iron using hydrogen.

The present invention combines these three discoveries in an elegant manner which is useful in both single stage and two stage iron carbide production systems, as well as hybrids of single stage and two stage production systems. The single stage and two stage processes are typically carried out in one and two reactor vessels, respectively.

In the process for converting iron-bearing materials to iron carbide described in the related art, a five species gas mixture is employed. This gas mixture consists of methane, hydrogen, carbon monoxide, carbon dioxide and water vapor in equilibrium with iron carbide. In a preferred embodiment of the prior process, only hydrogen and methane are used as input gases to the closed loop recycle gas system employed in the process. This then gives an overall reaction which can be expressed as follows:

$$Fe_3O_4 + CH_4 + 2H_2 \rightleftharpoons Fe_3C + 4H_2O \qquad 1)$$

$$3Fe_2O_3 + 2CH_4 + 5H_2 \rightleftharpoons 2Fe_3C + 9H_2O \qquad 2)$$

However, the inventors believe that metallic iron is not effectively and efficiently converted to iron carbide by gas mixtures containing only methane and hydrogen. It is believed that metallic iron is more readily converted to iron carbide by mixtures of CO and $H_2$. While not wishing to be bound by any theory, the inventors believe that the conversion of iron oxides to iron carbide is accomplished more efficiently and effectively when it occurs stepwise according to the following sequence:

$$Fe_2O_3 \rightarrow Fe_3O_4 \rightarrow FeO \rightarrow Fe \rightarrow Fe_3C \qquad 3)$$

The iron oxides are reduced to metallic iron by the hydrogen in the system, after which the metallic iron is converted to iron carbide according to the following reaction:

$$3Fe + CO + H_2 \rightleftharpoons Fe_3C + H_2O \qquad 4)$$

While not wishing to be bound by any theory, the present inventors believe the process of the present invention is particularly advantageous in those situations where metallic iron is present in the system. It is believed that, while methane and hydrogen can be employed to convert iron oxides directly to iron carbide, the process does not work as well when metallic iron is present. The present inventors believe that carbon oxide is a better carbiding agent when the process proceeds in the stepwise manner shown in 3). This is because the carbon oxide provides oxygen to combine with the hydrogen, thus forming water. This in turn prevents the hydrogen from attacking the iron carbide which is formed and converting the iron carbide back to metallic iron.

When adequate carbon oxide is present in the reactor, metallic iron can be difficult to detect in any substantial quantities, e.g., it is often only one percent or less. The absence of a substantial amount of metallic iron may have lead some people to believe that metallic iron is not a critical part of the overall reaction. However, it is believed that metallic iron is formed and is a critical part of the reaction. It is believed that it is hard to detect because the conversion of metallic iron to iron carbide with carbon oxide is extremely rapid and the metallic iron does not exist long enough to be measured in significant quantities. For example, when carbon oxide is not present, metallic iron does exist at much higher levels because it will not react quickly with methane to form iron carbide.

Reaction 4) requires that adequate carbon oxide be present in the system to convert the metallic iron to iron carbide. Specifically, one mole of carbon oxide must be generated or introduced into the system for each three moles of iron which are to be converted to iron carbide. Calculations demonstrate that to supply the stoichiometric amount of carbon oxide required, in a typical commercial reactor having a circulating gas where about 39 moles of gas are used per mole of iron to accomplish conversion of the iron to iron carbide, the gas should contain at least about 0.84 mole percent CO at the point where it contacts the metallic iron.

Methods for achieving the desired amount of carbon oxide in the circulating gas include: 1) external addition of carbon oxide to the circulating gas; 2) generating the required carbon oxide internally in the recycle gas stream without external carbon oxide additions; or 3) a combination of 1) and 2). In practice it is undesirable to add the carbon oxide externally because the carbon oxide would introduce additional oxygen into the system and the removal of this additional oxygen would require increased consumption of hydrogen to accomplish its removal as condensable water vapor. For example, if the required carbon was to come from externally added carbon monoxide, then equation 2) listed above would have to be rewritten as follows, with none of the required hydrogen being obtained from methane:

$$3Fe_2O_3 + 2CO + 11H_2 \rightarrow 2Fe_3C + 11H_2O \qquad 2a)$$

In other words, each mole of externally added carbon monoxide requires an additional three moles of hydrogen and results in the production of an additional mole of excess water, when compared to the amount of hydrogen required and water produced in the overall process employing one mole of externally added methane. Each mole of externally added carbon dioxide requires four additional moles of hydrogen and results in the production of an additional two moles of excess water, when compared to the requirement for one mole of externally added methane.

The advantages of the present invention can be clearly understood by reference to the equilibria equations set forth in FIG. 1. As illustrated in FIG. 1, once the process has achieved sustainable steady state, the only reactants that need to be added are the iron oxide solids feed, hydrogen and methane. The only products which need to be removed are condensable water vapor and the desired iron carbide product. It is to be understood that although FIG. 1 illustrates the iron oxide as $Fe_3O_4$ and the iron carbide product as $Fe_3C$, the present invention also works with other forms of iron oxide feed and iron carbide product, such as $Fe_2O_3$ and $Fe_2C$, respectively. As can be seen from FIG. 1, the process of the present invention employs internally generated carbon monoxide and water to convert iron to iron carbide. In this way, iron carbide can be effectively and efficiently produced from iron oxides.

This reaction scheme provides a number of advantages. For example, the amount of hydrogen that needs to be added to the system is reduced relative to a system in which carbon monoxide or carbon dioxide are added from an external source. Additionally, by employing internally generated carbon monoxide as the carbiding agent, as opposed to methane, the conversion of iron to iron carbide proceeds more efficiently. Furthermore, the amount of water which must be removed from the system is minimized due to the fact that additional oxygen is not imported with added carbon monoxide or with added carbon dioxide.

In accordance with the present invention a method is provided to permit the recycle gas stream to regenerate the required carbon oxide content of the gas. This is accomplished by establishing, delineating and controlling the conditions where the water vapor, generated from the reduction of iron oxides with hydrogen, is used to react with methane in the presence of iron-bearing catalysts to regenerate the carbon oxide which is consumed in the conversion of metallic iron to iron carbide.

As explained in U.S. Pat. No. 5,366,897, it is possible to thermodynamically construct predominance or stability diagrams which show the maximum water vapor contents of the five species gas mixture used in converting iron oxides to iron carbide. Data from thermodynamic calculations indicate that a maximum water content of equilibrium gas compositions in an iron carbide system will be in the range of 11% to 15% when operating the iron carbide system at temperatures from 550° C. to 650° C. and pressures of 2 to 6 atmospheres absolute.

In actual practice it has been shown that it is uneconomical to hold the iron oxide in the presence of the carbiding gases until complete gas equilibrium is obtained. Economic considerations indicate that the conversion of hydrogen to water vapor is best limited to ⅓ to ½ of the theoretical maximum as defined by thermodynamic constraints. This means that in commercial reactors the off gas from the reactor will carry from 4 to 6 percent of water in the five species gas mix. It therefore becomes important to insure that this is an adequate water level to insure that sufficient carbon oxide is generated in place in the reactor, through the reaction of methane with water vapor, to provide the carbon oxide required as a carbiding agent without the need for importing CO or $CO_2$ from an external source. These reactions are as follows:

$$CH_4 + H_2O \rightleftharpoons CO + 3H_2 \quad 5)$$

$$CO + H_2O \rightleftharpoons CO_2 + H_2 \quad 6)$$

It has been determined through both theoretical calculations and experimental test work that operating a commercial reactor at a temperature of 550° C. to 670° C. under 2 to 6 atmospheres of pressure can permit the required amount of water vapor to be formed and that this water vapor can react with methane to form an adequate volume of carbon oxide to permit the conversion of Fe to $Fe_3C$.

However, it has been found to be advantageous to provide a portion of the water vapor in the input process gas. Preferably, the amount of water vapor in the process gas entering fluidized bed reactor contains from about 0.3 to about 2% water vapor, more preferably from about 0.5% to about 1.5% water vapor. If more water vapor is present, the production rate of iron carbide can be decreased. If less water vapor is present, the stability of methane in the process gas decreases and the potential for methane cracking increases. This can cause soot or free carbon formation in a fluidized bed and/or inside gas heater tubes. The water vapor in a recycled process gas which enters the windbox of the fluidized bed can be controlled by controlling the temperature to which the gas is cooled after it exits the top of the fluidized bed. For example, gas cooled to 86° F. at 39.5 psig will contain 1.13% water vapor as a function of water vapor pressure versus total pressure. It should be recognized that there are other methods of removing water from gas than cooling it, such as using triethylene glycol (TEG) to absorb water from the gas, similar to routine practice in the dehydration of natural gas.

Preferably, the recycled gas which enters the windbox of the fluidized bed reactor contains the following (or equivalents thereof), in mole percent, from about 0.4 to about 35 percent, preferably from about 0.7 to about 3 percent carbon monoxide; up to about 10 percent, preferably from about 0.2 to about 2.5 percent carbon dioxide; up to about 75 percent, preferably from about 35 to about 70 percent methane; up to about 50 percent, preferably from about 25 to about 40 percent hydrogen; from about 0 to about 10 percent, preferably from about 0 to about 5 percent nitrogen; and up to about 10 percent, preferably from about 0.5 to about 2 percent water vapor. The ratio of water:methane is preferably from about 1:50 to about 1:5 and more preferably about 1:10.

It should be noted that while methane is present in the system, both in the recycle gas and in the reactor, it does not have to be added in the form of methane. For example, a hydrocarbon gas such as propane or natural gas can be introduced into the system. When the hydrocarbon gas is heated in the process gas heater at temperatures up to about 750° C., the higher hydrocarbons in the make-up gas equilibrate with hydrogen in the recycle gas to form methane. Naturally, the presence of higher hydrocarbons in the carbon-rich gas increases elemental hydrogen consumption as opposed to gas containing all methane.

During the conversion, the gas pressure above the fluidized bed reactor is preferably in the range of about 1 atmosphere to about 6 atmospheres, more preferably between about 2 atmospheres and about 5 atmospheres and preferably about 4 atmospheres. The temperature in the windbox space below the fluidized bed is preferably in the range between about 500° C. and about 750° C., and more preferably in the range between about 600° C. and about 700° C. The temperature in the space above the fluidized bed is preferably in the range between about 500° C. and about 700° C., and more preferably between about 550° C. and about 670° C.

An example of a typical fluidized bed reactor temperature is 590° C. and a typical pressure is 4 atmospheres. Under these conditions, a typical input gas can include 56.4 percent methane, 37.7 percent hydrogen, 1.1 percent water, 1.31 percent carbon monoxide, 0.49 percent carbon dioxide and 3 percent nitrogen, and the typical off gas can include 55.45 percent methane, 35.18 percent hydrogen, 4.75 percent water, 1.26 percent carbon monoxide, 0.47 percent carbon dioxide and 2.89 percent nitrogen. Therefore excess water must be removed from, and supplemental hydrogen and methane added to, the off gas before recycling.

After conversion, the iron components in the carburized feed preferably comprise at least about 80 percent, more preferably at least about 90 percent, more preferably at least about 95 percent and most preferably at least about 98 percent iron carbide. Preferably the iron carbide is predominantly $Fe_3C$ (e.g. at least 90 percent $Fe_3C$). The remaining impurities typically include oxides or metallic iron. Preferably, the maximum iron oxide content is about 5 percent while the maximum amount of metallic iron is about 2 percent.

In order to accomplish the desired iron carbide production, it is necessary that the gases in the system remain in contact with the solids for specified times in order to react and equilibrate. It has been found that the gases preferably remain in contact with the solids for a minimum of 1.5 and preferably up to 10 or more seconds in order to achieve the desired conversions. These contact times are those calculated to describe gas residence time as though no solids were occupying the same space, the so called superficial velocity. Two approaches for obtaining this gas residence time are by adjusting 1) the solids bed depth; and 2) the fluidizing gas velocity. For example in a reactor with a 12 foot bed depth of solids and a 3.5 ft/sec fluidizing gas velocity, the resulting superficial gas contact time will be about 3.4 seconds.

Permissible gas velocity in a fluidized bed reactor is limited by the fluidization characteristics of the solids in the system, where too low a velocity will result in defluidization and too high a velocity will result in excessive solids carry-over from the bed. A recommended sequence of design and control is to choose the proper gas velocity as dictated by the solids particle size, and then choose a bed depth compatible with the desired gas residence time requirement. In turn this combination of gas velocity and bed depth should be checked against the desired solids residence time required for proper conversion of the iron oxides to iron carbide.

In proposed two stage process configurations such as that outlined in U.S. patent application Ser. No. 08/181,997 and Trinidad and Tobago Patent No. 48 of 1994, which are incorporated by reference herein in their entirety, wherein in the first stage, iron oxides are partially or completely reduced to metallic iron or to sub-oxides by the use of gas mixtures high in hydrogen, it is important that the reaction leave sufficient oxygen in the first stage product as iron oxide to supply the necessary oxygen for the production of water vapor in the second stage reactor to insure adequate internal carbon oxide production from the methane/water vapor reaction. If this is not done, then CO or $CO_2$ from an external source must be provided, which will cause an increase in overall hydrogen consumption in order to remove the additional oxygen that is entering the system with the CO or $CO_2$. In practice this means that in a two stage process, not over ½ and preferably not over ⅓ of the oxygen in the feed should be removed in the first stage reactor.

Experimental Procedure

In the following examples, tests using beds of iron carbide or magnetite were conducted in a 2 inch diameter fluidized bed reactor where hot process gas, containing only methane, hydrogen, and water vapor, was fed into the bottom of the reactor. The gas flow rate was matched with the inventory of solids in the bed to give the desired gas contact time with the solids, based on the gas superficial velocity through the bed. Water vapor was added to the inlet gas to give the desired water vapor concentration in the gas, which ranged from about 1 to 6% by mole volume. The gas composition, in terms of methane and hydrogen, was chosen from a region of the Fe—O—H—C stability diagram, for the appropriate temperature, that would result in formation of $Fe_3C$, rather than other iron compounds. Each example looked at various combinations of gas residence time, ranging from 1 to 7 seconds, and reactor bed temperature ranging from 550° to 630° C. The gas exiting the reactor was analyzed for CO and $CO_2$. Since there was no CO or $CO_2$ in the inlet gas, any carbon oxide present in the off gas had to be formed in situ in the reactor bed by the reaction between the methane and water vapor contained in the inlet gas. The pressure at the top of the reactor bed during all the tests was maintained at 4 atmospheres. These tests were considered to be batch tests, in that solids were not continuously fed to, and removed from, the reactor. Those familiar with gas analysis techniques will realize that some of the slight inconsistency in the results is due to the inherent problems associated with measuring gas concentrations on an absolutely reliable basis.

EXAMPLE 1

During all of the tests in this example, the water vapor concentration in the inlet gas was about 1% and the bed solids were iron carbide. The test conditions in terms of gas residence time and reactor temperature, along with the resultant CO and $CO_2$ content of the exit gas were as follows:

TABLE 1

| Gas Residence Time sec | Reactor Temp (°C.) | CO (volume %) | $CO_2$ (volume %) |
|---|---|---|---|
| 1 | 550 | 0.00 | 0.00 |
| 3 | 550 | 0.00 | 0.08 |
| 7 | 550 | 0.00 | 0.10 |
| 7 | 590 | 0.05 | 0.15 |

TABLE 1-continued

| Gas Residence Time sec | Reactor Temp (°C.) | CO (volume %) | $CO_2$ (volume %) |
|---|---|---|---|
| 3 | 630 | 0.00 | 0.00 |
| 7 | 630 | 0.28 | 0.08 |

The results show that exit CO and $CO_2$ levels increased as gas residence time increased and as temperature increased.

EXAMPLE 2

During all of the tests in this example, the water vapor concentration in the inlet gas was about 3% and the bed solids were iron carbide. The test conditions in terms of gas residence time and reactor temperature, along with the resultant CO and $CO_2$ content of the exit gas were as follows:

TABLE 2

| Gas Residence Time sec | Reactor Temp (°C.) | CO (volume %) | $CO_2$ (volume %) |
|---|---|---|---|
| 1 | 550 | 0.00 | 0.00 |
| 1 | 590 | 0.00 | 0.01 |
| 3 | 590 | 0.00 | 0.07 |
| 7 | 590 | 0.44 | 0.11 |
| 1 | 630 | 0.63 | 0.06 |
| 3 | 630 | 0.73 | 0.09 |
| 7 | 630 | 0.70 | 0.09 |

The results again show that exit CO and $CO_2$ levels increased as residence time increased and as temperature increased. When compared to Example 1, the increase in water vapor concentration to 3% generally resulted in an increase in the amount of CO and $CO_2$ formed at certain gas residence times and reactor temperature.

EXAMPLE 3

During all of the tests in this example, the water vapor concentration in the inlet gas was about 6% and the bed solids were iron carbide. The test conditions in terms of gas residence time and reactor temperature, along with the resultant CO and $CO_2$ content of the exit gas were as follows:

TABLE 3

| Gas Residence Time sec | Reactor Temp (°C.) | CO (volume %) | $CO_2$ (volume %) |
|---|---|---|---|
| 1 | 550 | 0.00 | 0.01 |
| 3 | 550 | 0.00 | 0.31 |
| 7 | 550 | 0.57 | 0.36 |
| 1 | 590 | 0.08 | 0.24 |
| 3 | 590 | 0.79 | 0.33 |
| 7 | 590 | 1.25 | 0.51 |
| 1 | 630 | 0.08 | 0.10 |
| 3 | 630 | 1.38 | 0.30 |
| 7 | 630 | 1.63 | 0.41 |

The results again continue to show that exit CO and $CO_2$ levels generally increased as residence time increased and as temperature increased. The beneficial effect of increasing the water vapor originally shown in Example 2, was further demonstrated and amplified in Example 3. Another way of stating the gas residence time—temperature—water vapor relationship, is that as water vapor concentration and temperature increase, the gas residence time, or contact time, necessary to obtain the desired conversion to carbon oxide is decreased.

EXAMPLE 4

The $Fe_3C$ bed solids were replaced with $Fe_3O_4$ solids and the water vapor concentration in the inlet gas was set at 1% by volume. Due to the reaction between iron oxides and hydrogen, the exit gas water vapor contents was expected to increase as a function of both gas residence time and temperature. The water vapor, CO and $CO_2$ concentrations shown in Table 4 were measured in the reactor exit gas.

TABLE 4

| Residence Time sec | Reactor Temp (°C.) | Water Vapor (%) | CO (v %) | $CO_2$ (v %) |
|---|---|---|---|---|
| 3 | 550 | 2.0 | 0.00 | 0.07 |
| 7 | 550 | 2.5 | 0.00 | 0.10 |
| 7 | 590 | 4.6 | 0.03 | 0.08 |
| 7 | 630 | 7.1 | 0.02 | 0.13 |

When compared to tests in Examples 1, 2 and 3 in terms of gas residence time, temperature, and water vapor in the inlet gas, the tests in Example 4 did not produce any real measurable quantities of CO and $CO_2$, whereas the tests in the previous three examples produced CO levels up to 1.6% and $CO_2$ levels up to 0.5%. Analysis of the final bed sample showed the $Fe_3O_4$ solids had undergone substantial conversion to $Fe_3C$, indicating that while the CO and $CO_2$ had formed at predictable rates, they were rapidly consumed during the conversion of the reduced iron forms to iron carbide. Bed samples were not analyzed after each test in Example 4, but integration of the time spent at each test condition with expected carbon oxide formation levels, shows good agreement between the amount of carbon oxide that could have been generated and the amount of carbon oxides that would have been consumed in achieving the final $Fe_3C$ content in the reactor bed. This example also shows that the reaction between reduced iron and carbon oxide is extremely fast, on the order of a few seconds. The final bed sample contained less than 1% metallic iron, again showing that Fe reacts almost immediately with carbon oxide at reactor conditions used in the tests in Example 4.

EXAMPLE 5

The following values represent theoretical CO and $CO_2$ levels expected at the various combinations of water vapor concentration and temperature used in the tests in Examples 1–4.

TABLE 5

| Water Vapor (%) | Reactor Temp (°C.) | CO (volume %) | $CO_2$ (volume %) |
|---|---|---|---|
| 1 | 550 | 0.14 | 0.02 |
| 6 | 550 | 0.69 | 0.40 |
| 1 | 590 | 0.18 | 0.01 |
| 3 | 590 | 0.59 | 0.11 |
| 6 | 590 | 1.06 | 0.36 |
| 1 | 630 | 0.26 | 0.01 |
| 3 | 630 | 0.81 | 0.09 |
| 6 | 630 | 1.47 | 0.28 |

Other than at 1% water vapor at temperatures of 550° and 590° C., the tests results in Examples 1–3 agreed closely with the theoretical data where the gas residence time was the longest at 7 seconds. With rapid conversion of carbon oxides to $Fe_3C$ experienced in the tests in Example 4, the actual amount of carbon oxide in the gas passing through the bed in a commercial reactor, where the bed solids will be a mixture of reduced iron forms and $Fe_3C$, will always be at some level slightly below equilibrium levels since the carbon oxides are consumed as quickly as they are formed. Assuming an asymptotical approach to theoretical reaction equilibrium, and with gases in a commercial reactor always being off-set slightly below the equilibrium level, the actual conversion rate of methane and water vapor to carbon oxide should prove to be slightly faster than observed in the batch reactor test results.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A method for producing iron carbide from iron oxide comprising:
   (a) providing at least about 2 mole percent water vapor, wherein a first portion of the water vapor is generated by reducing iron oxide in the presence of hydrogen and a second portion of the water vapor is provided with an input process gas;
   (b) contacting water vapor with methane for at least 1.5 seconds of superficial gas contact time in the presence of iron-bearing catalysts to generate gaseous carbon oxide; and
   (c) converting iron to iron carbide in the presence of carbon oxide.

2. The method of claim 1, wherein there is adequate water vapor in a reactor to ensure that sufficient carbon oxide is generated in the reactor, through the reaction of methane with water vapor, to provide the carbon oxide required as a carbiding agent in the formation of iron carbide without having to add carbon oxide from an external source.

3. The method of claim 1, wherein the iron carbide is produced at a temperature of from about 550° C. to about 670° C.

4. The method of claim 1, wherein the internal pressure of a reactor in which the iron carbide is produced is from about 1 to about 6 atmospheres.

5. The method of claim 1, wherein the gases remain in contact with the iron-bearing catalysts from about 1.5 seconds to about 10 seconds of superficial gas contact time.

6. The method of claim 1, wherein the water vapor level is from about 3 mole percent to about 7 mole percent.

7. The method of claim 1, wherein said carbon oxide is carbon monoxide, carbon dioxide or a mixture thereof.

8. The method of claim 1, further comprising the steps of:
   (a) determining the fluidization characteristics of solid particles which are to be converted to iron carbide;
   (b) determining a superficial gas velocity sufficiently high to provide for the fluidization of said solid particles and sufficiently low to prevent excessive solids carry-over from a fluidized bed in a reactor; and
   (c) selecting a bed depth which will provide a superficial gas contact time of from about 1.5 to about 10 seconds.

9. The method of claim 1, wherein iron carbide is produced in a single stage reactor in which the reduction of iron oxide to iron and the carburization of iron to iron carbide takes place in said single stage reactor.

10. The method of claim 1, wherein iron carbide is produced in a two-stage reactor or reactors in which in the first stage part of the iron oxide is reduced to iron and at least 50 percent of the oxygen in said iron oxide remains in said iron oxide and in a second stage said iron oxide is reduced to iron and iron is carburized to iron carbide.

11. The method of claim 1, wherein iron carbide is produced in a two stage reactor or reactors in which in the first stage part of the iron oxide is reduced to iron and in the second stage said iron oxide is reduced to iron and iron is carburized to iron carbide using a combination of internally-generated and externally-added carbon oxide.

12. The method of claim 1, wherein said gases have a superficial gas velocity of from about 1 to about 7 feet/second.

13. The method of claim 1, wherein said input process gas includes from about 0.3 mole percent to about 2 mole percent water vapor.

14. The method of claim 1, wherein said input process gas includes from about 0.5 mole percent to about 1.5 mole percent water vapor.

15. The method of claim 1, wherein said method is practiced in a fluidized bed reactor system.

16. The method of claim 1, wherein said method is practiced in a fluidized bed reactor system and said input process gas comprises treated, recycled off gas.

17. A method for producing iron carbide from iron oxide comprising internally generating substantially all of the carbon monoxide and carbon dioxide required to serve as the carbiding agent required to carburize iron to iron carbide.

18. A method for producing iron carbide comprising controlling the water vapor generated by the reduction of iron oxide using hydrogen in order to provide enough water vapor to convert methane to carbon monoxide and carbon dioxide.

19. The method of claim 18, wherein said carbon monoxide and carbon dioxide are sufficient to serve as substantially all of the carbiding agent to convert iron oxide and iron into iron carbide.

20. The method of claim 18, wherein said water vapor is supplemented with water vapor included in an input process gas.

21. The method of claim 20, wherein said input process gas comprises from about 0.3 mole percent to about 2 mole percent water vapor.

22. The method of claim 20, wherein said input process gas comprises from about 0.5 mole percent to about 1.5 mole percent water vapor.

23. The method of claim 18, wherein said method takes place within a fluidized bed reactor.

24. The method of claim 20, wherein said method takes place within a fluidized bed and said input gas comprises treated, recycled off gas.

25. A method for producing iron carbide from iron oxide in a fluidized bed reactor comprising:
   a) providing from about 2 to about 10 mole percent water vapor in said fluidized bed reactor, wherein a first portion of the water vapor is generated by reducing iron oxide in the presence of hydrogen and a second portion of the water vapor comprising from about 0.3 mole percent to about 2 mole percent is provided with an input process gas;
   b) contacting water vapor with methane for about 1.5 to about 10 seconds of superficial gas contact time in the presence of iron bearing catalysts to generate sufficient gaseous carbon monoxide to act as the carbiding agent in the formation of $Fe_3C$ without having to add carbon monoxide from an external source; and
   c) converting iron to $Fe_3C$ in the presence of carbon monoxide.

26. A method for producing iron carbide from iron oxide in a two stage system comprising:
   a) in a first stage partially reducing up to 66 percent of said iron oxide to iron;
   b) in a second stage reducing said remaining iron oxide to iron in the presence of hydrogen in order to generate water vapor and contacting methane and water vapor in the presence of iron bearing catalysts to generate gaseous carbon oxide; and
   c) converting iron to iron carbide in the presence of carbon oxide.

27. The method of claim 17, wherein said carbon monoxide and carbon dioxide are generated by contacting water vapor with methane for at least 1.5 seconds of superficial gas contact time in the presence of iron-bearing catalysts.

28. The method of claim 17, wherein the iron carbide is produced at a temperature of from 550° C. to about 670° C.

29. The method of claim 27, wherein the gases remain in contact with the iron-bearing catalyst from about 1.5 seconds to about 10 seconds of superficial gas contact time.

30. The method of claim 27, wherein the water vapor level is from about 3 mole percent to about 7 mole percent.

31. The method of claim 17, wherein an input process gas includes from about 0.3 mole percent to about 2 mole percent water vapor.

32. The method of claim 17, wherein an input process gas includes from about 0.5 mole percent to about 1.5 mole percent water vapor.

33. The method of claim 18, wherein said carbon monoxide and carbon dioxide are generated by contacting water vapor with methane for at least 1.5 seconds of superficial gas contact time in the presence of iron-bearing catalysts.

34. The method of claim 18, wherein the iron carbide is produced at a temperature of from 550° C. to about 670° C.

35. The method of claim 33, wherein the gases remain in contact with the iron-bearing catalyst from about 1.5 seconds to about 10 seconds of superficial gas contact time.

36. The method of claim 18, wherein the water vapor level is from about 3 mole percent to about 7 mole percent.

37. The method of claim 26, wherein said carbon oxide is generated by contacting water vapor with methane for at least 1.5 seconds of superficial gas contact time in the presence of iron-bearing catalysts.

38. The method of claim 26, wherein the iron carbide is produced at a temperature of from 550° C. to about 670° C.

39. The method of claim 37, wherein the gases remain in contact with the iron-bearing catalyst from about 1.5 seconds to about 10 seconds of superficial gas contact time.

40. The method of claim 26, wherein the water vapor level is from about 3 mole percent to about 7 mole percent.

41. The method of claim 26, wherein a second stage input process gas includes from about 0.3 mole percent to about 2 mole percent water vapor.

42. The method of claim 26, wherein a second stage input process gas includes from about 0.5 mole percent to about 1.5 mole percent water vapor.

* * * * *